United States Patent [19]

Honma et al.

[11] Patent Number: 4,551,327

[45] Date of Patent: Nov. 5, 1985

[54] PROCESS FOR PRODUCING COBALT-AND FERROUS IRON-CONTAINING FERROMAGNETIC IRON OXIDES

[75] Inventors: Ichiro Honma; Arata Koyama; Masatoshi Amano, all of Moriyama; Nobusuke Takumi, Kusatsu, all of Japan

[73] Assignee: Ishihara Sangyo Kaishi, Limited, Osaka, Japan

[21] Appl. No.: 513,033

[22] Filed: Jul. 12, 1983

[30] Foreign Application Priority Data

Jul. 16, 1982 [JP] Japan ................................ 57-123918

[51] Int. Cl.$^4$ .............................................. C01G 49/06
[52] U.S. Cl. ................................... 423/594; 252/62.56
[58] Field of Search ...................... 423/594; 252/62.56

[56] References Cited

U.S. PATENT DOCUMENTS

| | | | |
|---|---|---|---|
| 4,066,564 | 1/1978 | Sasazawa et al. ................ | 252/62.56 |
| 4,066,565 | 1/1978 | Sasazawa et al. ................ | 252/62.56 |
| 4,224,175 | 9/1980 | Montino et al. ................. | 252/62.56 |
| 4,267,207 | 5/1981 | Sasazawa et al. ................ | 252/62.56 |

FOREIGN PATENT DOCUMENTS

| | | | |
|---|---|---|---|
| 50-37667 | 4/1975 | Japan ................................ | 252/62.56 |
| 0005494 | 1/1977 | Japan ................................ | 252/62.56 |
| 52-36751 | 9/1977 | Japan . | |
| 0106895 | 8/1979 | Japan ................................ | 252/62.56 |
| 0056605 | 4/1980 | Japan ................................ | 252/62.56 |
| 56-104721 | 8/1981 | Japan . | |
| 56-48444 | 11/1981 | Japan . | |
| 1585419 | 3/1981 | United Kingdom . | |

Primary Examiner—L. Dewayne Rutledge
Assistant Examiner—Robert L. McDowell
Attorney, Agent, or Firm—Cushman, Darby & Cushman

[57] ABSTRACT

An aqueous slurry of a magnetic iron oxide powder is mixed with a suspension prepared by neutralizing an aqueous ferrous salt solution with an alkali to form ferrous hydroxide and then adding an aqueous cobalt salt solution thereto, and the excess OH concentration of the mixed slurry is adjusted to 0.05 to 3 mol/l, thereby obtaining a cobalt-and ferrous iron-containing ferromagnetic iron oxide. The cobalt-and ferrous iron-containing ferromagnetic iron oxide is excellent in coercivity, distribution of coercivity and other magnetic properties, and the magnetic tape produced by using such iron oxide is also excellent in coercivity and switching field distribution.

12 Claims, No Drawings

PROCESS FOR PRODUCING COBALT-AND FERROUS IRON-CONTAINING FERROMAGNETIC IRON OXIDES

BACKGROUND OF THE INVENTION

1. FIELD OF THE INVENTION

This invention relates to a process for producing a ferromagnetic iron oxide which is useful as a material for magnetic recording media. More particularly, the invention relates to a process for producing a cobalt- and ferrous iron-containing ferromagnetic iron oxide having excellent magnetic properties such as high coercivity and a good distribution of coercivity.

2. DESCRIPTION OF THE PRIOR ART

In comparison with $\gamma$-$Fe_2O_3$ powders or magnetic iron oxide powders containing cobalt alone which have hitherto been generally used, the cobalt- and ferrous iron-containing ferromagnetic iron oxide powder has a markedly high coercivity and the magnetic recording media produced therefrom are capable of high-density recording and also possess excellent properties such as good sensibility in the high frequency region.

Various methods have recently been proposed for producing such cobalt- and ferrous iron-containing ferromagnetic iron oxide powder. For example, the following methods are typically known: (1) A cobalt salt solution is added to an aqueous slurry of $\gamma$-$Fe_2O_3$, then an alkali is added thereto to coat the particle surfaces of $\gamma$-$Fe_2O_3$ with a cobalt hydroxide and then an aqueous solution of a ferrous salt is added to the slurry (Japanese Patent Publication 48444/81); (2) The method of (1) is carried out under heating (Japanese Patent Laid-Open 104721/81); and (3) the $\gamma$-$Fe_2O_3$ particles are dispersed in a mixed aqueous solution of a ferrous salt and a cobalt salt and then an alkali is added thereto to effect simultaneous coating of both ferrous hydroxide and cobalt hydroxide on the surfaces of said $\gamma Fe_2O_3$ particles (Japanese Patent Publication 36751/77).

However, according to the above-mentioned methods (1) and (2), the obtained magnetic iron oxide powder, although it is improved in coercivity, is unsatisfactory in the distribution of coercivity and magnetic tapes produced by using such powder would prove to be poor in the switching field distribution, squareness, orientability and other properties. In the case of the method (3), the magnetic iron oxide particle surfaces tend to be roughened as they could be partly dissolved by the alkali, and also an epitaxial reaction advances rapidly to broaden the distribution of coercivity. Thus, the improvements over these methods have been required.

SUMMARY OF THE INVENTION

The cobalt- and ferrous iron-containing ferromagnetic iron oxide obtained according to the process of this invention is excellent in coercivity and distribution of coercivity in comparison with the prior art products, and also the magnetic tape manufactured by using such iron oxide of this invention is excellent in coercivity as well as in the switching field distribution and other magnetic properties.

The process of this invention is distinguished from any of the conventional methods especially in the following points: (1) A suspension is prepared with a cobalt salt solution, a ferrous salt solution and an alkali solution, before they are added to a slurry of $\gamma$-$Fe_2O_3$. (2) Said ferrous salt and cobalt salt are mixed not directly with each other but in the following way: for example, a ferrous salt solution is first added to an aqueous alkali solution to form ferrous hydroxide and then a cobalt salt solution is added thereto to prepare a suspension in which the cobalt salt or cobalt hydroxide particles stay around the precipitated particles of ferrous hydroxide. (3) The thus prepared suspension is mixed with the $\gamma$-$Fe_2O_3$ slurry and the mixed slurry is adjusted to a certain specified excess OH concentration.

Thus, this invention provides a process for producing a cobalt- and ferrous iron-containing ferromagnetic iron oxide characterized in that a slurry formed by dispersing a magnetic iron oxide powder in water is mixed with a coating suspension obtained by neutralizing a ferrous salt solution with an alkali to form ferrous hydroxide and then adding a cobalt salt solution thereto, with the excess OH concentration of the mixed slurry being adjusted to 0.05 to 3 mol/l.

DETAILED DESCRIPTION OF PREFERRED EMBODIMENTS

The magnetic iron oxide powder used in this invention may be, for example $\gamma$-$Fe_2O_3$ powder, $Fe_3O_4$ powder, or powder of Berthollide compounds obtained by treating $\gamma$-$Fe_2O_3$ in a suitable way, for example, by partially reducing the $\gamma$-$Fe_2O_3$ in a reducing gas such as hydrogen. Among them, the $\gamma$-$Fe_2O_3$ powder is most preferred.

The "suspension" used herein is a suspension containing a ferrous compound and a cobalt compound which are to coat the particle surfaces of said magnetic iron oxide. The process of this invention is especially characterized by this suspension. Such suspension per se can be easily obtained by first neutralizing a ferrous salt solution with an alkali to form ferrous hydroxide and then adding a cobalt salt solution thereto. After the addition of cobalt salt solution, the suspension is usually aged under stirring for a period of time from 5 minutes to 2 hours, but such aging may be omitted when a long period of time elapses for the addition of said metal salts. The amount of the alkali added may be at least sufficient to neutralize substantially the whole of the ferrous salt, but preferably it is within the range from an amount sufficient to neutralize the whole of the ferrous salt to an excess of an amount sufficient to neutralize the whole of both the ferrous salt and cobalt salt. If the amount of the alkali added is less than the above-mentioned range, the resulting product proves to be poor in coercivity and other magnetic properties such as squareness and orientability. The most preferred range of the amount of alkali added is from an amount sufficient to neutralize the whole of the cobalt salt to an excess thereof, for example, such that the excess OH concentration in the suspension will be within the range of from 0 to 2 mol/l, preferably 0.1 to 0.5 mol/l.

Said suspension should be prepared at a temperature within the range of from 0° to 100° C., preferably below 60° C., most preferably 10° to 50° C. If the temperature is too much higher than the above-mentioned range, the particles of hydroxide produced are urged to grow, resulting in a reduced activity thereof to the magnetic iron oxide to retard the enhancement of coercivity. On the other hand, too low a temperature requires a long period of time for bringing the hydroxide into an active state, leading to a poor economy. It is desirable that the preparation of said suspension is carried out under a non-oxidizing atmosphere, but it can be performed in an open system if no positive introduction of an oxidative gas is made from the outside of the system. As the ferrous salt for the preparation of said suspension, there may be used ferrous chloride, ferrous sulfate and the like, and as the cobalt salt, one may use cobalt sulfate, cobalt chloride, cobalt acetate and the like. As the alkali, there may be used the hydroxides, oxides or carbonates of alkali metals or alkaline earth metals, such as sodium hydroxide, potassium hydroxide, sodium oxide, calcium carbonate and the like. The amount of the ferrous salt added ranges usually from 2 to 30 atomic percent, preferably 4 to 25 atomic percent, most preferably 5 to 20 atomic percent, calculated as Fe, based on the iron atoms in the magnetic iron oxide powder. As for the cobalt salt, it is added in an amount of usually 1 to 20 atomic percent, preferably 2 to 10 atomic percent, most preferably 3 to 7 atomic percent, calculated as Co, based on the iron atoms in the magnetic iron oxide powder.

The thus prepared suspension is then mixed with a slurry of said magnetic iron oxide and the excess OH concentration of the mixed slurry is adjusted to 0.05 to 3 mol/l, preferably 0.5 to 2 mol/l. If the excess OH concentration is higher than the range above, the coated cobalt and iron hydroxides may be dissolved to make it unable to obtain the desired effect, while a lower excess OH concentration than the above-mentioned range causes a deterioration of coercivity, distribution of coercivity and other magnetic properties. During this mixing operation, the temperature of the mixed slurry is maintained usually at 50° C. or below, preferably at 10° to 40° C.

The following methods are available for adjusting the excess OH concentration of the mixed slurry within the above-defined range: (1) A predetermined amount of alkali is added to the mixed slurry; (2) When said suspension is prepared, an alkali is added in an amount greater than the equivalent of the ferrous and cobalt salts; and (3) An alkali is added to the slurry formed by dispersing a magnetic iron oxide powder in water. Of these methods, method (3) is preferred.

This mixed suspension, with its excess OH concentration maintained within the above-mentioned range, is aged usually for more than 30 minutes, preferably more than one hour, under or without stirring. This reaction and aging are preferably accomplished under a non-oxidizing atmosphere by, for example, introducing (bubbling) an inert gas into the mixed slurry or by replacing air in the reactor with an inert gas.

The mixed slurry of the magnetic iron oxide obtained through the above-described treatments is filtered, washed with water and dried in usual ways to obtain a cobalt- and ferrous iron-containing ferromagnetic iron oxide powder of this invention. It is recommended to subject the mixed slurry before filtration to a hydrothermal treatment with an alkali in an autoclave at a temperature of 100° to 200° C. and to subject the cake after filtration and water-washing or after drying in an non-oxidizing or oxidizing atmosphere to a heat treatment in a non-oxidizing or oxidizing atmosphere at a temperature of 60° to 250° C., or to subject the wet cake after filtration and water-washing to a heat-treatment under water vapor at a temperature of 60° to 300° C., because these treatments can provide a ferromagnetic iron oxide powder with the even bettered magnetic properties. The "heat-treatment under water vapor" means to heat the wet cake in the presence of water vapor. More definitely, the wet cakes of ferromagnetic iron oxide after filtration and water washing are subjected to the heat-treatment under water vapor, or the wet cakes are dried at as low a temperature as possible in a non-oxidizing atmosphere and then heated in the presence of water vapor. It includes a treatment in which said cakes are heated in a sealed vessel such as an autoclave or in an open type tube furnace filled with nitrogen gas or in a fluidized bed in the presence of hot water vapor. Also, said heat treatment in a non-oxidizing or oxidizing atmosphere may be conducted after said hydrothermal treatment in an autoclave or after said heat-treatmet under water vapor.

The cobalt- and ferrous iron containing ferromagnetic iron oxide obtained according to the above-described process of this invention is excellent in coercivity, distribution of coercivity and other magnetic properties, and the magnetic tape made by using such ferromagnetic iron oxide is also excellent in coercivity, switching field distribution and other magnetic properties.

EXAMPLE 1

75 g of $\gamma$-$Fe_2O_3$ powder (coercivity: 420 Oe) was dispersed in water to form 750 ml of a slurry, and to this slurry was added 102 ml of an aqueous sodium hydroxide solution having a concentration of 10 mol/l. Nitrogen gas was supplied into a reactor so that a non-oxidizing atmosphere prevailed in the system. On the other hand, 29.5 ml of an aqueous sodium hydroxide solution having a concentration of 10 mol/l was added to 105 ml of an aqueous ferrous sulfate solution (0.895 mol/l as Fe) at 30° C. in a non-oxidizing atmosphere to form ferrous hydroxide and then 52.5 ml of an aqueous cobalt sulfate solution (0.848 mol/l as Co) was added thereto to prepare a suspension. The excess OH concentration of this suspension was 0.1 mol/l. This suspension was mixed with the above-mentioned slurry in an non-oxidizing atmosphere and the mixed slurry was aged under stirring at room temperature for 5 hours. This mixed slurry had an excess OH concentration of 1 mol/l. The thus obtained slurry was filtered and washed with water in usual ways and the obtained wet cakes were put into an autoclave together with water kept in a separate container. After replacing the autoclave atmosphere with $N_2$ gas, the autoclave was closed and the material therein was subjected to a heat treatment under a saturated water vapor pressure at 130° C. for 6 hours and then further dried at 60° C.

EXAMPLE 2

The process of Example 1 was repeated except that the mixed slurry after aging was subjected to a hydrothermal treatment for 3 hours in an autoclave at 130° C. and the obtained slurry was filtered and washed with water in usual ways to form the wet cakes, the cakes being dried at 60° C.

EXAMPLE 3

75 g of the same $\gamma$-$Fe_2O_3$ powder as used in Example 1 was dispersed in water to form 750 ml of a slurry, and to this slurry was added 8 ml of an aqueous sodium hydroxide solution having a 10 mol/l concentration. Nitrogen gas was supplied into a reactor to place the system under a non-oxidizing atmosphere. Apart from this, 105 ml of an aqueous ferrous sulfate solution (0.895 mol/l as Fe) was added to 29.5 ml of an aqueous 10 mol/l sodium hydroxide solution in a non-oxidizing atmosphere to form ferrous hydroxide and 52.5 ml of an aqueous cobalt sulfate solution (0.848 mol/l as Co) was added thereto to prepare a suspension. The excess OH concentration of this suspension was 0.1 mol/l. This suspension was mixed with the previously formed slurry in an non-oxidizing atmosphere and the mixed slurry was further added with 94 ml of an aqueous 10 mol/l sodium hydroxide solution and aged under stirring at room temperature for 5 hours. This mixed slurry showed an excess OH concentration of 1 mol/l. The thus obtained slurry was filtered and washed with water by ordinary methods, then subjected to a heat treatment in the presence of water vapor in the same way as in Example 1 and further dried at 60° C.

EXAMPLE 4

75 g of the same $\gamma$-$Fe_2O_3$ as used in Example 1 was dispersed in water to form 750 ml of a slurry and 113 ml of an aqueous 10 mol/l sodium hydroxide solution was added thereto. Then nitrogen gas was supplied into a reactor to turn the system into a non-oxidizing atmosphere. Separately from this, 105 ml of an aqueous ferrous sulfate solution (0.895 mol/l as Fe) was added to 18.8 ml of an aqueous 10 mol/l sodium hydroxide solution at 30° C. to form ferrous hydroxide and 52.5 ml of an aqueous cobalt sulfate solution (0.848 mol/l as Co) was added thereto to prepare a suspension. This suspension was mixed with the above-mentioned slurry and aged under stirring at room temperature for 5 hours. The excess OH concentration of this mixed slurry was 1 mol/l. The obtained slurry was filtered, washed with water, heat treated with water vapor in the same manner as in Example 1 and dried at 60° C.

EXAMPLE 5

75 g of the same $\gamma$-$Fe_2O_3$ as used in Example 1 was dispersed in water to form 750 ml of a slurry and to this slurry was added 102 ml of an aqueous 10 mol/l sodium hydroxide solution. Then nitrogen gas was supplied into a reactor to create a non-oxidizing atmosphere in the system. On the other hand, 105 ml of an aqueous ferrous sulfate solution of a 0.895 mol/l concentration as Fe was added to 29.5 ml of an aqueous 10 mol/l sodium hydroxide solution at 40° C. to form ferrous hydroxide and 52.5 ml of an aqueous cobalt sulfate solution with a 0.848 mol/l concentration as Co was added thereto to prepare a suspension, the suspension being maintained at 40° C. This suspension was mixed with the above-mentioned slurry in a non-oxidizing atmosphere and aged under stirring at room temperature for 5 hours. The excess OH concentration of this mixed slurry was 1 mol/l. The thus obtained slurry was filtered and washed with water, followed by a water vapor heat treatment in the same manner as in Example 1 and further drying at 60° C.

COMPARATIVE EXAMPLE 1

The process of Example 1 was repeated except that 29.5 ml of an aqueous sodium hydroxide solution (conc. 10 mol/l) was first added to 52.5 ml of an aqueous cobalt sulfate solution (0.848 mol/l as Co) to form cobalt hydroxide and then 105 ml of an aqueous ferrous sulfate solution (0.895 mol/l as Fe) was added thereto to prepare a suspension, and this suspension was mixed with a $\gamma$-$Fe_2O_3$ dispersed slurry.

COMPARATIVE EXAMPLE 2

75 g of the same $\gamma$-$Fe_2O_3$ as used in Example 1 was dispersed in water to form 750 ml of a slurry. To this slurry was added 123 ml of an aqueous 10 mol/l sodium hydroxide solution, and nitrogen gas was supplied into a reactor to place the system under a non-oxidizing atmosphere. Aside from this, 52.5 ml of an aqueous cobalt sulfate solution (0.848 mol/l as Co) was added to 8.9 ml of an aqueous 10 mol/l sodium hydroxide solution to produce cobalt hydroxide and 105 ml of an aqueous ferrous sulfate solution (0.895 mol/l as Fe) was added thereto to prepare a suspension. This suspension was mixed with the above-mentioned slurry in a non-oxidizing atmosphere and aged under stirring at room temperature for 5 hours. The excess OH concentration of this mixed slurry was 1 mol/l. The obtained slurry was filtered, washed with water, heat treated in the presence of water vapor in the same manner as in Example 1 and further dried at 60° C.

COMPARATIVE EXAMPLE 3

75 g of the same $\gamma$-$Fe_2O_3$ as used in Example 1 was dispersed in water to form 750 ml of a slurry and into this slurry was incorporated 102 ml of an aqueous 10 mol/l sodium hydroxide solution. Then nitrogen gas was supplied into the reactor to create a non-oxidizing atmosphere in the system. Apart from this, 52.5 ml of an aqueous cobalt sulfate solution (0.848 mol/l as Co) and 105 ml of an aqueous ferrous sulfate solution (0.895 mol/l as Fe) were added simultaneously to 29.5 ml of an aqueous 10 mol/l sodium hydroxide solution to prepare a suspension. This suspension and the above-mentioned slurry were mixed in a non-oxidizing atmosphere and aged under stirring at room temperature for 5 hours. The excess OH concentration of this mixed slurry was 1 mol/l. The thus obtained slurry was filtered and washed with water, followed by a heat treatment with water vapor in the same manner as in Example 1 and further drying at 60° C.

COMPARATIVE EXAMPLE 4

75 g of the same $\gamma$-$Fe_2O_3$ as used in Example 1 was dispersed in water to form 750 ml of a slurry, and after adjusting the slurry to 30° C., nitrogen gas was supplied into the reactor to create a non-oxidizing atmosphere in the system. To this slurry was first added an aqueous solution containing 52.5 ml of an aqueous cobalt sulfate solution (0.848 mol/l as Co) and then further added 8.9 ml of an aqueous 10 mol/l sodium hydroxide solution to produce cobalt hydroxide, followed by further addition of 122.7 ml of an aqueous 10 mol/l sodium hydroxide solution and then further adding 105 ml of an aqueous ferrous sulfate solution (0.895 mol/l as Fe). The obtained slurry has an excess OH concentration of 1 mol/l. This slurry was aged under stirring at room temperature for 5 hours. The resulting slurry was filtered, washed with water, heat treated in the presence of water vapor in the same way as in Example 1 and further dried at 60° C.

COMPARATIVE EXAMPLE 5

750 ml of a slurry obtained by dispersing in water 75 g of the same $\gamma$-$Fe_2O_3$ as used in Example 1 was added to an aqueous solution containing 105 ml of an aqueous ferrous sulfate solution (0.895 mol/l as Fe) and 52.5 ml of an aqueous cobalt sulfate solution (0.848 mol/l as Co) and stirred. This slurry was heated to 90° C. and, while maintained at this temperature, 132 ml of an aqueous 10 mol/l sodium hydroxide solution incorporated into the slurry in a non-oxidizing atmosphere. The excess OH concentration of this slurry was 1 mol/l. This slurry, kept at 90° C., was aged under stirring for 5 hours, and then it was filtered, washed with water, heat treated with water vapor as in Example 1 and further dried at 60° C.

Regarding the magnetic iron oxides obtained in Examples 1 to 5 Comparative Examples 1 to 5 described above, first their coercivity was measured by a usual method and then, by using each of these iron oxides, a blend was prepared according to the recipe shown below and the blend was mixed up in a ball mill to produce a magnetic coating.

Blend:

| | | |
|---|---|---|
| (1) Magnetic iron oxide | 100 | parts by weight |
| (2) Soybean lecithin | 1 | parts by weight |
| (3) Surfactant | 4 | parts by weight |
| (4) Vinyl chloride-vinyl acetate copolymer resin | 15 | parts by weight |
| (5) Dioctyl phthalate | 5 | parts by weight |
| (6) Methyl ethyl ketone | 111 | parts by weight |
| (7) Toluene | 122 | parts by weight |

Then each of the produced magnetic coating materials was applied on a polyester film, orientated and dried in usual ways to make magnetic tapes having an approximately 9 μm magnetic coating. The coercivity, squareness (Br/Bm), orientability (OR), maximum induction (Bm) and switching field distribution (SFD) of each magnetic tape were determined in the known ways, and the results are reported in Table 1.

TABLE 1

| | Powder Hc(Oe) | Measurements on tapes | | | | |
|---|---|---|---|---|---|---|
| | | Hc(Oe) | Bm (Gauss) | Br/Bm | OR | SFD |
| Example 1 | 660 | 701 | 1587 | 0.84 | 2.12 | 0.39 |
| Example 2 | 627 | 672 | 1509 | 0.84 | 2.27 | 0.39 |
| Example 3 | 638 | 660 | 1665 | 0.83 | 2.07 | 0.39 |
| Example 4 | 645 | 668 | 1620 | 0.82 | 2.05 | 0.41 |
| Example 5 | 653 | 671 | 1657 | 0.83 | 2.05 | 0.40 |
| Comparative Example 1 | 555 | 608 | 1574 | 0.85 | 2.15 | 0.43 |
| Comparative Example 2 | 582 | 600 | 1576 | 0.82 | 2.00 | 0.49 |
| Comparative Example 3 | 600 | 630 | 1605 | 0.83 | 2.04 | 0.45 |
| Comparative Example 4 | 663 | 694 | 1533 | 0.81 | 1.89 | 0.45 |
| Comparative Example 5 | 510 | 551 | 1541 | 0.83 | 2.23 | 0.43 |

EXAMPLE 6

75 g of γ-Fe$_2$O$_3$ powder (coercivity: 420 Oe; average particle diameter along the major axis: 0.4 μm; axial ratio: 8) was dispersed in water to form 750 ml of a slurry, and to this slurry was added 102 ml of an aqueous sodium hydroxide solution having a concentration of 10 mol/l. Nitrogen gas was supplied into a reactor so that a non-oxidizing atmosphere prevailed in the system. On the other hand, 29.5 ml of an aqueous sodium hydroxide solution having a concentration of 10 mol/l was added to 105 ml of an aqueous ferrous sulfate solution (0.895 mol/l as Fe) at 30° C. in a non-oxidizing atmosphere to form ferrous hydroxide and then 52.5 ml of an aqueous cobalt sulfate solution (0.848 mol/l as Co) was added thereto to prepare a suspension. The excess OH concentration of said suspension was 0.1 mol/l. This suspension was mixed in a non-oxidizing atmosphere with the above-mentioned slurry and the mixed slurry aged under stirring at room temperature for 5 hours. The excess OH concentration of said slurry was 1 mol/l. The thus obtained slurry was filtered and washed with water in usual ways and the obtained wet cakes were subjected to a heat treatment in a nitrogen gas atmosphere at 150° C. for 2 hours.

COMPARATIVE EXAMPLE 6

75 g of the same γ-Fe$_2$O$_3$ as used in EXAMPLE 6 was dispersed in water to form 750 ml of a slurry. After the slurry temperature was adjusted to 30° C., nitrogen gas was supplied into a reactor so that a non-oxidizing atmosphere prevailed in the system. To the reactor was addd 52.5 ml of an aqueous cobalt sulfate solution (0.848 mol/l as Co) and then 8.9 ml of an aqueous 10 mol/l sodium hydroxide solution to produce cobalt hydroxide, to which were added 122.7 ml of an aqueous 10 mol/l sodium hydroxide solution and further 105 ml of an aqueous ferrous sulfate solution (0.895 mol/l as Fe). The excess OH concentration of the slurry was 1 mol/l. Said slurry was aged under stirring at room temperature for 5 hours. The thus obtained slurry was filtered and washed with water in usual ways and the obtained wet cakes were subjected to heat treatment in the same manner as in EXAMPLE 6.

With the magnetic iron oxides prepared in EXAMPLE 6 and COMPARATIVE EXAMPLE 6, their coercivity was measured in a usual way. Then magnetic tapes were produced using said iron oxides in the same manner as in the foregoing examples. The coercivity, squareness (Br/Bm), orientability (OR), maximum induction (Bm) and switching field distribution (SFD) of the respective magnetic tapes were measured in usual ways. The results are reported in Table 2.

TABLE 2

| | Powder Hc(Oe) | Measurements on tapes | | | | |
|---|---|---|---|---|---|---|
| | | Hc(Oe) | Bm (Gauss) | Br/Bm | OR | SFD |
| Example 6 | 633 | 664 | 1473 | 0.83 | 2.13 | 0.45 |
| Comparative Example 6 | 630 | 662 | 1455 | 0.80 | 1.88 | 0.50 |

As is clear from Table 2, the magnetic tapes made from the cobalt- and ferrous iron-containing ferromagnetic iron oxide of this invention have an excellent squareness, orientability and switching field distribution.

The results of Table 1 reveal that the cobalt- and ferrous iron-containing ferromgnetic iron oxides produced according to the process of this invention have a high coercivity and the magnetic tapes made by using them are also excellent in coercivity, switching field distribution (SFD; it is generally desirable that the value of SFD is about 0.40 or less) and other magnetic properties.

What is claimed is:

1. A process for producing a cobalt- and ferrous iron-containing ferromagnetic iron oxide comprising
  (1) dispersing a magnetic iron oxide powder in water,
  (2) mixing this dispersion with a suspension prepared by
    (a) neutralizing a ferrous salt solution with an alkali to form ferrous hydroxide and then
    (b) adding a cobalt salt solution thereto, and (3) adjusting the excess OH concentration of this mixed slurry to 0.05 to 3 mol/l, thereby coating a ferrous compound and a cobalt compound on the surface of the magnetic iron oxide particles.

2. The process according to claim 1, wherein the amount of the alkali added is at least sufficient to neutralize substantially the whole of the ferrous salt.

3. The process according to claim 1, wherein the amount of the alkali is within the range from an amount sufficient to neutralize the whole of both ferrous salt and cobalt salt to an excess amount thereof which is an amount sufficient to make the excess OH concentration of the suspension ranging from 0 to 2 mol/l.

4. The process according to claim 1, wherein the amount of the alkali is within the range from an amount sufficient to neutralize the whole of both ferrous salt and cobalt salt to an excess amount thereof which is an amount sufficient to give the excess OH concentration of the suspension ranging from 0.1 to 0.5 mol/l.

5. The process according to claim 1, wherein an alkali is beforehand added to the slurry formed by dispersing a magnetic iron oxide powder in water.

6. The process according to claim 1, wherein when said slurry and said suspension are mixed, the temperature of the mixed slurry is maintained at 0° to 50° C.

7. The process according to claim 1, wherein the suspension is prepared at a temperature from 0° to 100° C.

8. The process according to claim 1, wherein the suspension is prepared at a temperature from 0° to 60° C.

9. The process according to claim 1, wherein the excess OH concentration of the mixed slurry is adjusted to 0.5 to 2 mol/l.

10. The process according to claim 1, subjecting the mixed slurry, before filtration, to a hydrothermal treatment in an alkali at a temperature from 100° to 200° C.

11. The process according to claim 1 comprising filtering and water washing the mixed slurry to form cakes of the cobalt- and ferrous iron-containing ferromagnetic iron oxide and subjecting the cakes to a heat-treatment under water vapor at a temperature from 60° to 300° C.

12. The process according to claim 1 comprising filtering and water washing the mixed slurry to form cakes of the cobalt- and ferrous iron-containing ferromagnetic iron oxide and subjecting the cakes to a heat treatment in a non-oxidizing or oxidizing atmosphere at a temperature from 60° to 250° C.

* * * * *